United States Patent
Czarnecki et al.

(10) Patent No.: US 7,058,652 B2
(45) Date of Patent: Jun. 6, 2006

(54) METHOD AND SYSTEM FOR EVENT PHRASE IDENTIFICATION

(75) Inventors: David Anthony Czarnecki, Clifton Park, NY (US); Corey Nicholas Bufi, Troy, NY (US); Melvin Kurt Simmons, Schenectady, NY (US)

(73) Assignee: General Electric Capital Corporation, Stamford, CT (US)

( * ) Notice: Subject to any disclaimer, the term of this patent is extended or adjusted under 35 U.S.C. 154(b) by 415 days.

(21) Appl. No.: 10/218,620

(22) Filed: Aug. 15, 2002

(65) Prior Publication Data

US 2004/0034649 A1   Feb. 19, 2004

(51) Int. Cl.
G06F 17/30   (2006.01)
(52) U.S. Cl. .................................. 707/102; 704/9
(58) Field of Classification Search ............ 707/102, 707/104.1, 6, 7, 101; 704/3, 4, 7, 9, 10
See application file for complete search history.

(56) References Cited

U.S. PATENT DOCUMENTS

| | | | | |
|---|---|---|---|---|
| 5,287,278 | A * | 2/1994 | Rau | 704/1 |
| 5,331,556 | A | 7/1994 | Black, Jr. et al. | 704/9 |
| 5,500,796 | A | 3/1996 | Black, Jr. | 704/9 |
| 5,819,265 | A * | 10/1998 | Ravin et al. | 707/5 |
| 5,832,480 | A * | 11/1998 | Byrd et al. | 707/5 |
| 5,963,940 | A * | 10/1999 | Liddy et al. | 707/5 |
| 5,978,797 | A | 11/1999 | Yianilos | |
| 6,014,632 | A | 1/2000 | Gamble | |
| 6,081,774 | A * | 6/2000 | de Hita et al. | 704/9 |
| 6,098,034 | A * | 8/2000 | Razin et al. | 704/9 |
| 6,138,088 | A | 10/2000 | Goeser | |
| 6,182,059 | B1 | 1/2001 | Angotti | |
| 6,438,579 | B1 | 8/2002 | Hosken | |
| 6,484,168 | B1 | 11/2002 | Pennock | |
| 6,542,888 | B1 | 4/2003 | Marques | |
| 6,625,335 | B1 * | 9/2003 | Kanai | 382/306 |
| 6,675,164 | B1 | 1/2004 | Kamath | |
| 6,714,914 | B1 | 3/2004 | Peters | |
| 6,718,367 | B1 | 4/2004 | Ayyadurai | |
| 6,718,368 | B1 | 4/2004 | Ayyadurai | |

(Continued)

OTHER PUBLICATIONS

Croft et al., The Use of Phrases and Structured Queries in Information Retrieval, 1991, ACM, pp. 32-45.*

(Continued)

*Primary Examiner*—Leslie Wong
(74) *Attorney, Agent, or Firm*—Hunton & Williams

(57) ABSTRACT

The invention provides a system and method for identifying text in a word set. The method may include retrieving a target term set including a plurality of target terms; retrieving the word set including a plurality of text words; normalizing target terms in the target term set to generate normalized terms; normalizing text words in the word set to generate normalized words; comparing the normalized terms with the normalized words to determine (1) a first match between a first normalized term and a first normalized word; and (2) a second match between a second normalized term and a second normalized word. The method may further include determining a distance between a text word position of the first normalized word and a text word position of the second normalized word to determine if any relative positions satisfy threshold criteria, and identifying a first text word position and a second text word position as constituting possible identified text once a relative position of the text word position of the first normalized word and a text word position of the second normalized word satisfies the threshold criteria.

22 Claims, 9 Drawing Sheets

U.S. PATENT DOCUMENTS

| | | |
|---|---|---|
| 6,766,319 B1 | 7/2004 | Might |
| 6,772,170 B1 | 8/2004 | Pennock |
| 6,879,722 B1 | 4/2005 | Crepy |
| 6,895,056 B1 | 5/2005 | Graley |
| 2001/0047324 A1 | 11/2001 | Hoffman |
| 2002/0107712 A1 | 8/2002 | Lam |
| 2002/0178140 A1 | 11/2002 | Woodmansee |
| 2003/0004914 A1* | 1/2003 | McGreevy .............. 707/1 |
| 2003/0083914 A1 | 5/2003 | Marvin, III |
| 2003/0084053 A1 | 5/2003 | Govrin |
| 2004/0093241 A1 | 5/2004 | Stone |
| 2004/0103118 A1 | 5/2004 | Irving |
| 2004/0117234 A1 | 6/2004 | Lindsay-Scott |
| 2004/0133927 A1* | 7/2004 | Sternberg et al. .......... 725/136 |
| 2004/0167884 A1 | 8/2004 | Wakefield |
| 2004/0167885 A1 | 8/2004 | Wakefield |
| 2004/0167886 A1 | 8/2004 | Wakefield |
| 2004/0167887 A1 | 8/2004 | Wakefield |
| 2004/0167911 A1 | 8/2004 | Wakefield |
| 2004/0243631 A1 | 12/2004 | Walker |
| 2004/0249650 A1 | 12/2004 | Freedman |
| 2005/0015452 A1 | 1/2005 | Corson |
| 2005/0060288 A1 | 3/2005 | von Groll |
| 2005/0114457 A1 | 5/2005 | Shih |
| 2005/0120009 A1 | 6/2005 | Brooke |

OTHER PUBLICATIONS

Cook et al., Discovering Models of Software Processes from Event-Based Data, 1998, ACM, vol. 7, No. 3, pp. 215-249.*

Philip A. Schrodt, *"Automated Coding of International Event Data Using Sparse Parsing Technologies,"* Department of Political Science, University of Kansas, Lawrence, KS 60045, USA, Email: p-schrodt@ukans.edu (Feb. 2001).

Software Patent Institute Database of Software Technologies, *"What Happens Behind the Scenes,"* at http://www.spi.org/fmanual/d_what.htm (Jan. 1997).

* cited by examiner

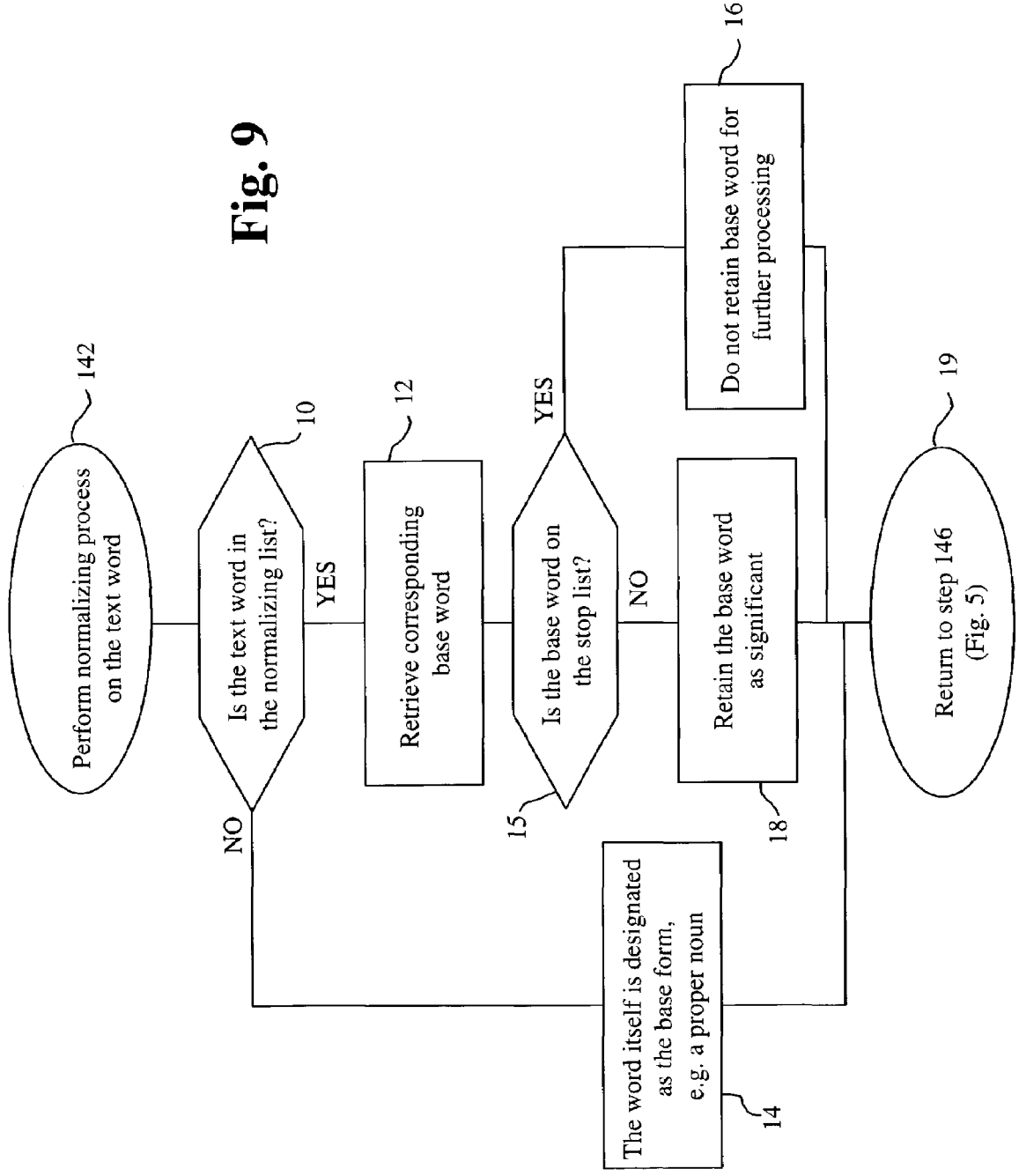

METHOD AND SYSTEM FOR EVENT PHRASE IDENTIFICATION

BACKGROUND OF THE INVENTION

News stories and various other documents, for example, contain various phrases one can term "events". Examples of such events are phrases such as "bankruptcy filing" or "going bankrupt". Typically these event phrases are made up of more than one word. A common operation is to scan a news story, or other text, for event related information. That is, a person might typically scan text for particular information related to a particular event.

However, when scanning news stories for event-related information, one may not have enumerated all the possibilities for how to represent a particular event or related events. For example, "file for bankruptcy" would be considered a related event to "bankruptcy filing", "filing for bankruptcy", and "filed for Chapter 11 bankruptcy". Similarly, "job cuts" can represent "cut 5 percent of jobs", "cut 290 jobs", "cutting 600 jobs", or "cutting about 230 jobs", for example. Known techniques fail to appreciate and effectively address these concerns.

Accordingly, the invention addresses these problems and others.

BRIEF SUMMARY OF THE INVENTION

The invention provides systems and methods for identifying text in a word set. In accordance with one aspect, the invention provides a method that may include retrieving a target term set including a plurality of target terms; retrieving the word set including a plurality of text words; normalizing target terms in the target term set to generate normalized terms; normalizing text words in the word set to generate normalized words; comparing the normalized terms with the normalized words to determine (1) a first match between a first normalized term and a first normalized word; and (2) a second match between a second normalized term and a second normalized word. The method may further include determining a distance between a text word position of the first normalized word and a text word position of the second normalized word to determine if any relative positions satisfy threshold criteria, and identifying a first text word position and a second text word position as constituting possible identified text once a relative position of the text word position of the first normalized word and a text word position of the second normalized word satisfies the threshold criteria.

In accordance with one aspect, the invention provides a system for identifying text in a word set comprising an input portion that retrieves a target term set including a plurality of target terms, and that retrieves the word set including a plurality of text words; a normalizing portion that normalizes target terms in the target term set to generate normalized terms, the normalizing portion further normalizing text words in the word set to generate normalized words; a comparing portion that compares the normalized terms with the normalized words to determine: a first match between a first normalized term and a first normalized word; and a second match between a second normalized term and a second normalized word; and a locations array processing portion that determines a distance between a text word position of the first normalized word and a text word position of the second normalized word to determine if any relative positions satisfy threshold criteria, and the locations array processing portion identifying a first text word position and a second text word position as constituting possible identified text once a relative position of the text word position of the first normalized word and a text word position of the second normalized word satisfies the threshold criteria.

In accordance with a further aspect, the invention provides a computer readable medium for identifying text in a word set, the computer readable medium comprising: a first portion that retrieves a target term set including a plurality of target terms, and that retrieves the word set including a plurality of text words; a second portion that normalizes target terms in the target term set to generate normalized terms, the second portion further normalizing text words in the word set to generate normalized words; a third portion that compares the normalized terms with the normalized words to determine: (1) a first match between a first normalized term and a first normalized word; and (2) a second match between a second normalized term and a second normalized word; and a fourth portion that determines a distance between a text word position of the first normalized word and a text word position of the second normalized word to determine if any relative positions satisfy threshold criteria, and the fourth portion identifying a first text word position and a second text word position as constituting possible identified text once a relative position of the text word position of the first normalized word and a text word position of the second normalized word satisfies the threshold criteria.

In accordance with a further aspect, the invention provides a method for identifying text in a word set comprising retrieving a target term set including a plurality of target terms; retrieving the word set including a plurality of text words; normalizing target terms in the target term set to generate normalized terms; normalizing text words in the word set to generate normalized words; comparing the normalized terms with the normalized words to determine (1) a first match between a first normalized term and a first normalized word; and (2) a second match between a second normalized term and a second normalized word; and determining a distance between a text word position of the first normalized word and a text word position of the second normalized word to determine if any relative positions satisfy threshold criteria, and identifying a first text word position and a second text word position as constituting possible identified text once a relative position of the text word position of the first normalized word and a text word position of the second normalized word satisfies the threshold criteria; wherein normalizing words in the word set includes normalizing significant words and non-significant words, the normalizing words in the word set further includes applying a stop list against normalized words, so as to eliminate non-significant words; and wherein comparing the normalized terms with the normalized words includes generating a normalized word list containing base words, each base word being associated with a respective text word position in the word set, and generating a normalized term list of all normalized terms; and wherein identifying a first text word position and a second text word position as constituting possible identified text once a relative position of the text word position of the first normalized word and a text word position of the second normalized word satisfies the threshold criteria, includes outputting the text word that corresponds to the first text word position and outputting the text word that corresponds to the second text word position.

In accordance with a further aspect, the invention provides a system for identifying text in a word set comprising an input portion that retrieves a target term set including a plurality of target terms, and that retrieves the word set including a plurality of text words; a normalizing portion that normalizes target terms in the target term set to generate normalized terms, the normalizing portion further normalizing text words in the word set to generate normalized words; a comparing portion that compares the normalized terms with the normalized words to determine (1) a first match between a first normalized term and a first normalized word; and a second match between a second normalized term and a second normalized word; and a locations array processing portion that determines a distance between a text word position of the first normalized word and a text word position of the second normalized word to determine if any relative positions satisfy threshold criteria, and the locations array processing portion identifying a first text word position and a second text word position as constituting possible identified text once a relative position of the text word position of the first normalized word and a text word position of the second normalized word satisfies the threshold criteria; wherein the comparing portion compares a normalized word list containing base words, each base word being associated with a respective text word position in the word set, with a normalized term list, the normalizing portion using a stop list to determine if any of the normalized terms or any of the normalized words are insignificant; and wherein the system outputs all text words between and including the text word that corresponds to the first text word position and the text word that corresponds to the second text word position, so as to output an identified phrase.

BRIEF DESCRIPTION OF THE DRAWINGS

The present invention can be more fully understood by reading the following detailed description together with the accompanying drawings, in which like reference indicators are used to designate like elements, and in which:

FIG. 9 is a flowchart showing the "perform normalizing process on the text word" step of FIG. 5 in further detail in accordance with one embodiment of the invention.

DETAILED DESCRIPTION OF THE INVENTION

Figure 1:
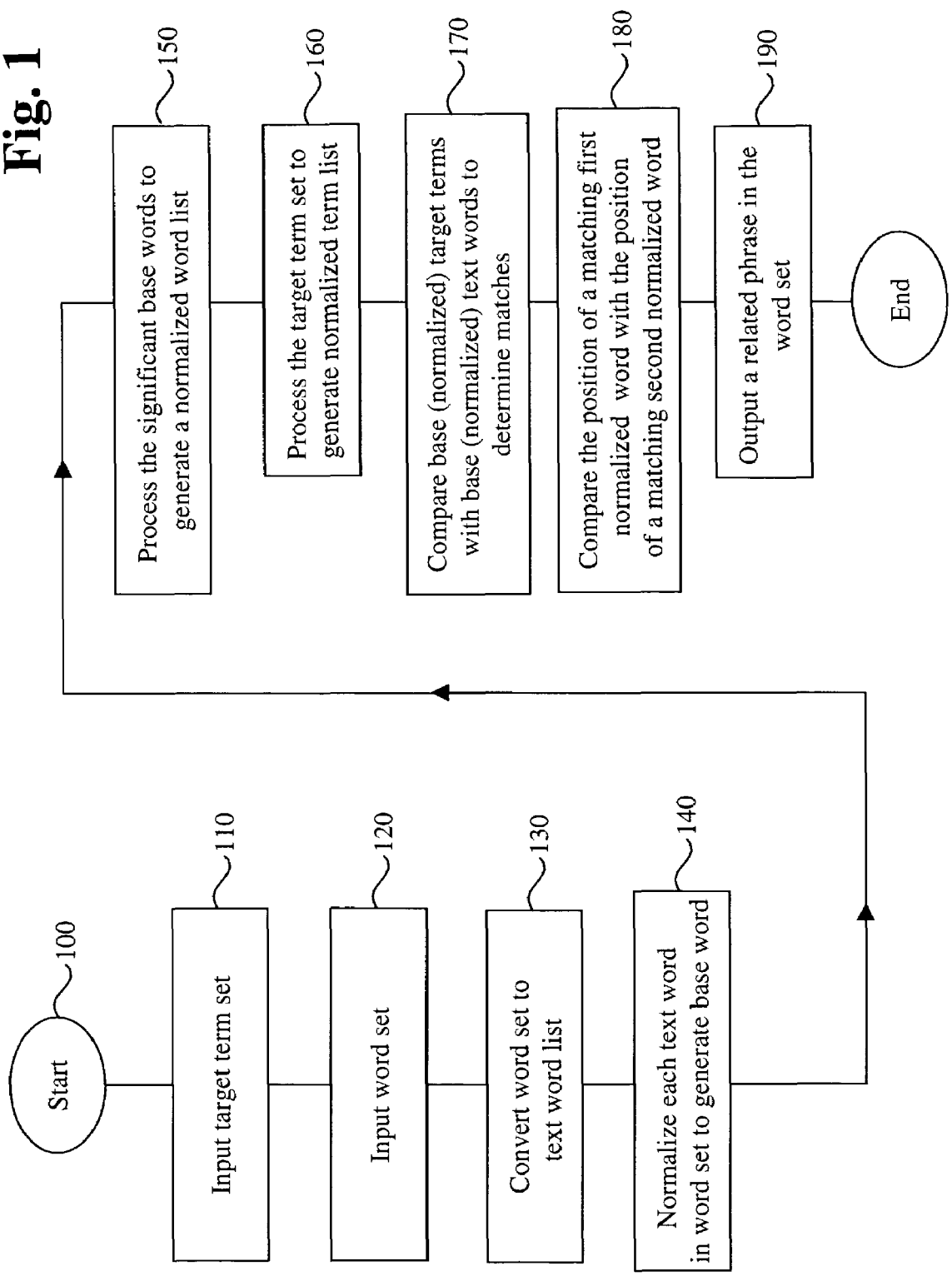
FIG. 1 is a flowchart showing an event phrase extrapolation process in accordance with one embodiment of the invention.

Hereinafter, aspects in accordance with various embodiments of the invention will be described. As used herein, any term in the singular may be interpreted to be in the plural, and alternatively, any term in the plural may be interpreted to be in the singular.

The foregoing description of various products, methods, or apparatus and their attendant disadvantages described in the "Background of the Invention" is in no way intended to limit the scope of the invention, or to imply that the invention does not include some or all of the elements of known products, methods, and/or apparatus in one form or another. Indeed, various embodiments of the invention may be capable of overcoming some of the disadvantages noted in the "Background of the Invention," while still retaining some or all of the various elements of known products, methods, and apparatus in one form or another.

The method and system of the invention are directed to the above stated problems, as well as other problems, that are present in conventional techniques. In summary, the system extrapolates events, in a document for example, based on event phrases that a user submits to the system. These new phrases are constructed from the words contained in the original event phrase, but may not necessarily be in the same order or tense as the original event phrase. A threshold is defined such that the method attempts to construct or match new phrases that match within a given word limit of the original event phrase.

As described above, news stories, for example, contain various phrases one can call "events". Examples of such events are phrases such as "bankruptcy filing" or "going bankrupt". Typically these event phrases are made up of more than one word. However, when scanning news stories for event-related information, one may not have enumerated all the possibilities for how to represent a particular event or related events. For example, "file for bankruptcy" would be considered a related event to "bankruptcy filing", "filing for bankruptcy", and "filed for Chapter 11 bankruptcy". Similarly, "job cuts" can represent "cut 5 percent of jobs", "cut 290 jobs", "cutting 600 jobs", or "cutting about 230 jobs", for example. This system and method of the invention extrapolates related events from an input pre-defined events. As a result, if the system knew about the "bankruptcy filing" event, it could also construct "filed for bankruptcy" to pick that new event up within a given article.

The invention provides an event phrase extrapolation based on a distance threshold. Event phrase extrapolation, as used in the invention, is based on the notion of "related" event phrases. In accordance with one embodiment of the invention, two constraints may be utilized. A first constraint is: an event A is "related" to event B if all significant words (words other than "and", "of", "but", etc.) in event B occur in event A. In this context, a word W occurs in a set of words if W itself is in the set, or if the base form of W is in the set. As used herein, a base form of a word means the form of a word from which inflectional and derivational suffixes are removed, in accordance with one embodiment of the invention. Accordingly, for example, the base form of the word "replaced" is "replace." The "base form" of a word, and aspects related to normalization of a word, are described in detail below. Further, a second constraint for related phrases is that an identified phrase A has at most D-many words, where D is an integer number.

In accordance with one embodiment of the invention, the process inputs (1) an event phrase, as well as (2) a text document. The process analyzes the text document, based on the event phrase, and returns related phrases and their positions in the text document as output. However, it should be appreciated that the system and method in accordance with the various embodiments of the invention are not limited to strictly an event phrase. That is, selected words or terms may be used also, i.e., that would not necessarily be considered to be a phrase. Accordingly, a "target term set" is used herein to mean an "event phrase" and/or simply any collection of words for which it is desired to identify related "word sets", for example. A target term set may typically be in the form of a phrase. The target term set might typically be 2–4 words, for example.

The process analyzes any of a wide variety of "word sets" based upon the target term set. A word set may typically be in the form of a text document, as noted above. However, the word set may quite simply be any collection of words, such as a portion of a document or portions of multiple documents. Further, the "word set" upon which the invention operates, may be words being output or input on an ongoing basis, i.e., a stream of words. Thus, such stream of words might not be considered a typical text document, but is considered a "word set" as used herein.

It should be appreciated that as used herein, a "term" and a "word" may be considered to be the same thing and thus interchangeable. However, for purposes of clearness, a "term" or "target term" has generally been used in the present application to identify a word that is in a target term set. On the other hand, a "word" or "text word" has generally been used in the present application to identify a word that is in a word set, i.e., that is in a news article to be analyzed, for example. Accordingly, using this helpful protocol, the invention looks at "text words" in a word set to identify any phrases in the document that are related to a set of "target terms" in a target term set.

Figure 2:
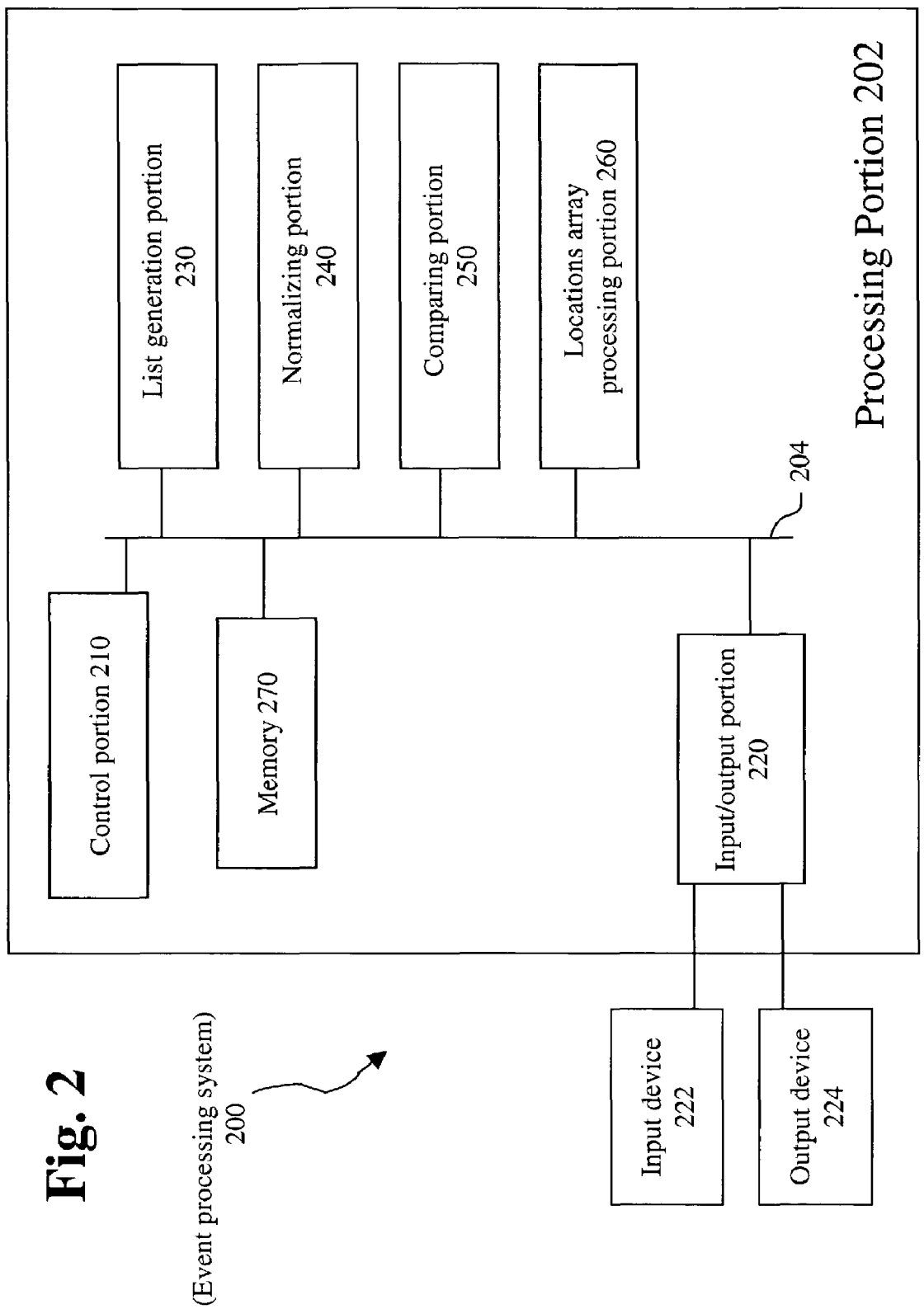
FIG. 2 is a block diagram showing an event processing system in accordance with one embodiment of the invention.

In further explanation of the invention, FIG. 1 is a flowchart showing a process in accordance with one embodiment of the invention. The flowchart of FIG. 1 may be performed by different operating systems in accordance with various embodiments of the invention. One such illustrative operating system is shown in FIG. 2. That is, FIG. 2 shows a block diagram of what might be characterized as an event processing system 200.

The event processing system 200 includes a processing portion 202. The processing portion 202 includes a control portion 210, an input/output portion 220 and a memory 270. The control portion 210 controls overall operations of the processing portion 202, such as coordinating the operation of the various components. The input/output portion 220 inputs and outputs a variety of data in conjunction with the input device 222 and the output device 224, respectively, as shown in FIG. 2. For example, the input device 222 might be a scanning device or a device to provide connection to the Internet. The output device 224 might be simply a monitor or a database.

The processing portion 202 further includes a list generation portion 230, a normalizing portion 240, a comparing portion 250, and a locations array processing portion 260. The list generation portion 230 creates and processes various data structures which might be characterized as "lists," for example. The normalizing portion 240, as is described further below, inputs a word or term and outputs the base word or "stem" of the input word.

Further, the comparing portion 250 performs various comparisons in accordance with one embodiment of the invention. Lastly, the locations array processing portion 260 analyzes various word occurrences vis-à-vis each other. The various components of the processing portion 202 are connected using a suitable interface 204, such as a bus. The various components of the processing portion 202 will be described in further detail below.

Returning now to the flowchart of FIG. 1, the process in accordance with one embodiment of the invention starts in step 100 and passes to step 110. In step 110, a target term set is input. For example, the target term set might be "CEO was replaced". The invention provides the ability to locate phrases in a word set, such as in an article or other document, that are related to the provided target term set. After step 110, the process passes to step 120. It should of course be appreciated that the particular sequence of steps as described herein may be varied as desired.

Figure 3:
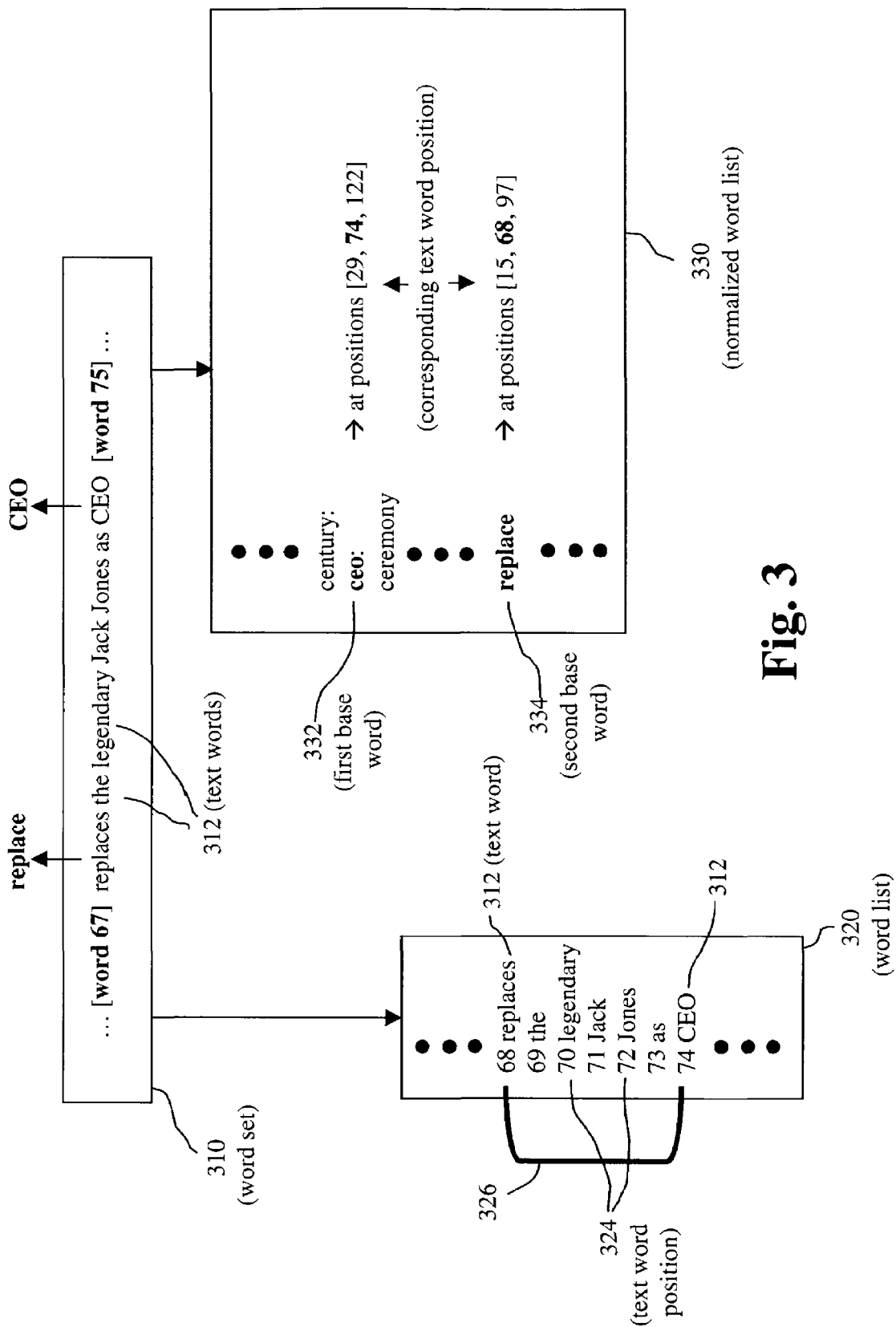
FIG. 3 is a diagram showing aspects of processing a word set in accordance with one embodiment of the invention.

In step 120, a word set is input. The word set 310 may typically be in the form of a document, such as a newspaper article, for example. As a result, the word set may be hundreds or even thousands of words long. Illustratively, the word set might include the words "... replaces the legendary Jack Jones as CEO ..." FIG. 3 is a diagram showing further aspects related to processing of a word set 310, in accordance with one embodiment of the invention. The word set 310 includes words or text words 312.

As shown in FIG. 3, the word set 310 includes the words "... replaces the legendary Jack Jones as CEO ...". More specifically, for purposes of illustration, it can be seen that the word "replaces" is the 68th word in the document. Further, the word "CEO" is the 74th word in the document, for example.

After step 120, the process passes to step 130, as shown in FIG. 1. In step 130, the word set 310 is converted to what might be characterized as a word list 320. As shown in FIG. 3, the word list 320 maps each text word position 324 in the word set 310 to the corresponding text word 312 at that particular position. Accordingly, the word list 320 includes "68 replaces", "69 the" and "74 CEO", for example.

Thus, the word list 320 includes all the words in the word set 310, i.e., both "significant words" and "non-significant words", in accordance with one embodiment of the invention. As described further below, a "significant word" is a word that is used in the searching aspect, whereas a "non-significant word" is not.

After step 130, the process passes to step 140, as shown in FIG. 1. In step 140, further processing is performed on the word set 310 so as to normalize each word in the word set. In accordance with one embodiment of the invention, the list generation portion 230 generates a normalized word list 330, as illustratively shown in FIG. 2.

To explain, in accordance with one embodiment of the invention, the list generation portion 230 proceeds through each word in the word set 310. For example, the list generation portion may have proceeded through processing of the word set 310 so as to arrive at the word "replaces." The list generation portion determines that such word is at position 68 in the word set 310. The process then normalizes the word "replaces."

That is, each of the terms in the target term set 350, as well as each of the terms in the word set 310 are processed by what might be characterized as a "normalizing" process. Accordingly, in one embodiment of the invention, each text word 312 in the word set 310 (and each term in the target term set 350 as discussed below) are stemmed so as to determine each word or term's base word. Illustratively, FIG. 4 is a diagram showing aspects of this process.

Figure 4:
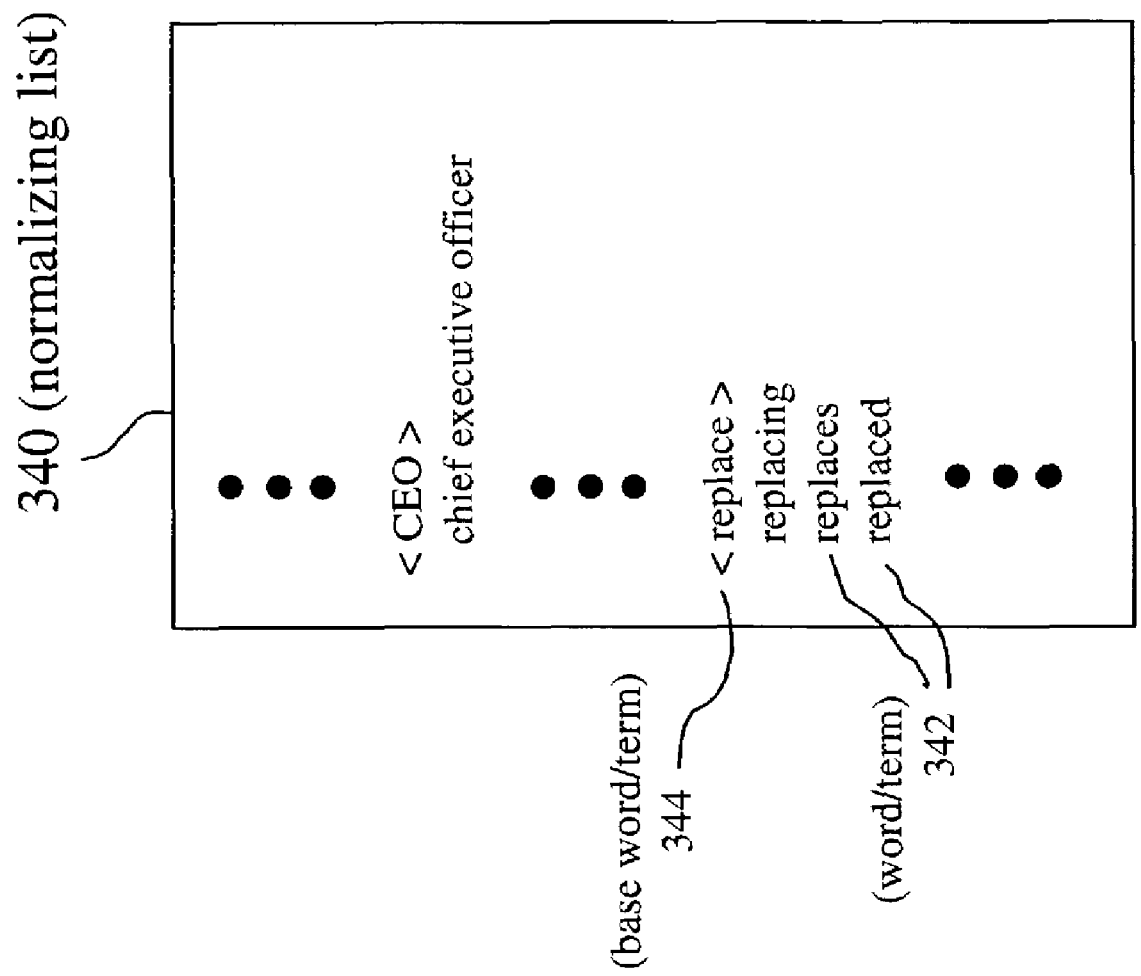
FIG. 4 is a diagram showing a normalizing list in accordance with one embodiment of the invention.

As shown in FIG. 4, the base word 344 "replace" is associated with a number of words 342 including "replacing", "replaces" and "replaced", for example. Thus, the normalizing portion 240, in accordance with one embodiment of the invention, will normalize any of the words— replacing, replaces or replaced—back to the base word 344 "replace". This normalizing process is performed for words/ terms in both the word set 310 and the target term set 350, discussed below. It should be appreciated that known off-the-shelf programs are available that may be used to provide the stemming operation of FIG. 4, i.e., so as to input a word and output the base form of the particular input word.

Figure 5:
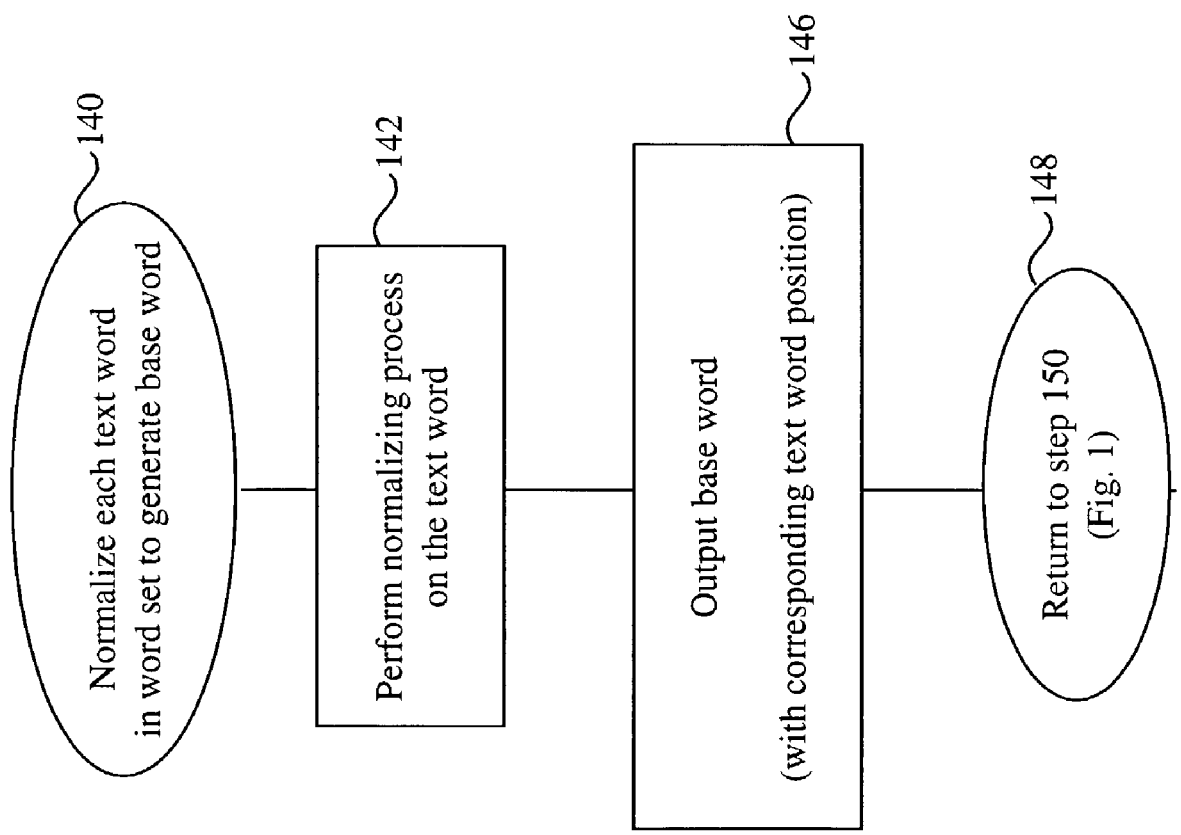
FIG. 5 is a flowchart showing the "normalize each text word in the word set to generate a respective base word" step of FIG. 1 in further detail in accordance with one embodiment of the invention.

With further reference to FIG. 4, FIG. 5 is a flowchart showing in further detail the process of normalizing the word set 310, i.e., FIG. 5 shows further details of step 140 of FIG. 1. As shown in FIG. 5, the sub-process starts in step 140, and passes to step 142.

In step 142, the normalizing portion 240 (in processing the text word "replaces" at position 68 in the word set 310) performs a normalizing process on the word "replaces". For example, the normalizing portion 240 attempts to locate the text word "replaces" in the normalizing list 340 shown in FIG. 4. Further details of the normalizing process are described below, with reference to FIG. 9. Illustratively, the normalizing portion may find the text word 312 "replaces" in the normalizing list 340, and as a result, retrieves the associated base word 344, i.e., the word "replace". That is, the normalizing portion 240 finds the text word 312 and retrieves the base word, which is associated with the given text word 312. After step 142, the process passes to step 146. In step 146, the normalizing portion 240 outputs the found base word to the list generation portion 230, along with the text word position that corresponds to the determined base word. This is assuming that the text word was not on a stop list, as is described further below. After step 146 of FIG. 5, the process passes to step 148. In step 148, the process returns to step 150 of FIG. 1.

It should be appreciated that in operation of the invention, typically only what may be considered "significant words/terms" in both the word set 310 and the target term set 350 are considered. That is, terms such as "replace" and "CEO" are considered significant. On the other hand, common function words such as "and", "of" and "but", for example, are not considered significant. FIG. 9 is illustrative of these aspects of the invention.

FIG. 9 is a flowchart showing in further detail step 142 of FIG. 5, i.e., perform normalizing process on a text word. As shown in FIG. 9, the subprocess starts in step 142. Then, the process passes to step 10. In step 10, the process, i.e., the normalizing portion 240 in accordance with one embodiment of the invention, determines whether the text word is on the normalizing list 340. If YES, then the process passes to step 12. In step 12, the normalizing portion 240 retrieves the base word from the normalizing list 340. After step 12, the process passes to step 15.

In step 15 of the process of FIG. 9, the normalizing portion 240 determines if the base word is on a stop list that is used. That is, it should be appreciated that the normalizing list 340 contains both significant words and non-significant words. If the word is found on the normalizing list 340, then the resulting base word is checked against a stop list, i.e., a list that contains common function words such as "and", "of", and "but". If a normalized word, i.e., the base word, is found on this stop list then it is not placed on the normalized word list 330 (or normalized term list 360 in the case of target terms, as described below). If the base word was NOT on the stop list in step 15, the process passes to step 18. In step 18, the process retains the base word as significant. After step 15, the process passes to step 19.

On the other hand, the process may determine that the base word is indeed on the stop list. As a result, the process passes form step 15 to step 16. In step 16, the base word, which was identified as not-significant, is not retained for further processing and will not be placed in the normalized word list 330, for example. After step 16, the process passes to step 19.

Alternatively, in step 10 described above, the normalizing portion 240 may determine that the text word is not on the normalizing list 340. As a result, the process passes to step 14. In step 14, the normalizing portion 240 designates the word itself as the base word. This is expected for proper nouns/names, which are considered significant words and often are not in normalizing lists. After step 14, the process passes directly to step 19. In step 19, the process returns to step 146 of FIG. 5.

It should be appreciated that the normalizing list or stemming process may in fact include proper nouns, i.e., a noun that designates a particular being or thing. This is in contrast to the example of FIG. 9 above. That is, the processing of step 10 of FIG. 9 may in fact handle the normalization of proper nouns or names, for example. As a result, the processing of step 14 would not be needed.

Returning now to step 150 of FIG. 1, the list generation portion 230, in accordance with one embodiment of the invention, processes the significant base words using the normalized word list 330, as shown in FIG. 3. That is for example, the list generation portion 230 determines if the base word "replace" is in the normalized word list 330. If the base word is not in the normalized word list 330, then the list generation portion 230 adds the base form to the normalized word list 330. The list generation portion 230 also adds the text word position to the normalized word list 330 so as to be associated with the respective base word.

Alternatively, the list generation portion 230 might determine that the normalized word list 330 already contains the base word. With reference to FIG. 3, the list generation portion 230, for example, might access the normalized word list 330 to process the base word "replace" at position 68. The list generation portion 230 determines that the normalized word list 330 does indeed already contain the base word "replace", i.e., since it was already found at position 15. As a result, the list generation portion 230 simply adds the additional position of the base word, i.e., the "68" position, to the normalized word list 330. As can be seen from FIG. 3, the list generation portion 230, after further processing, will also determine that a text word 312, such as "replacing", is at position 97 in the word set 310.

As a result of the processing of the list generation portion 230, the normalized word list 330 as shown in FIG. 3 is generated. The normalized word list 330 includes a list of all the base words that were found, along with the corresponding text word 312 position or positions, i.e., the various positions that a text word 312, which corresponds to the base word, occurred. For purposes of further discussion, the normalized word list contains a first base word 332 and a second base word 334.

Figure 6:
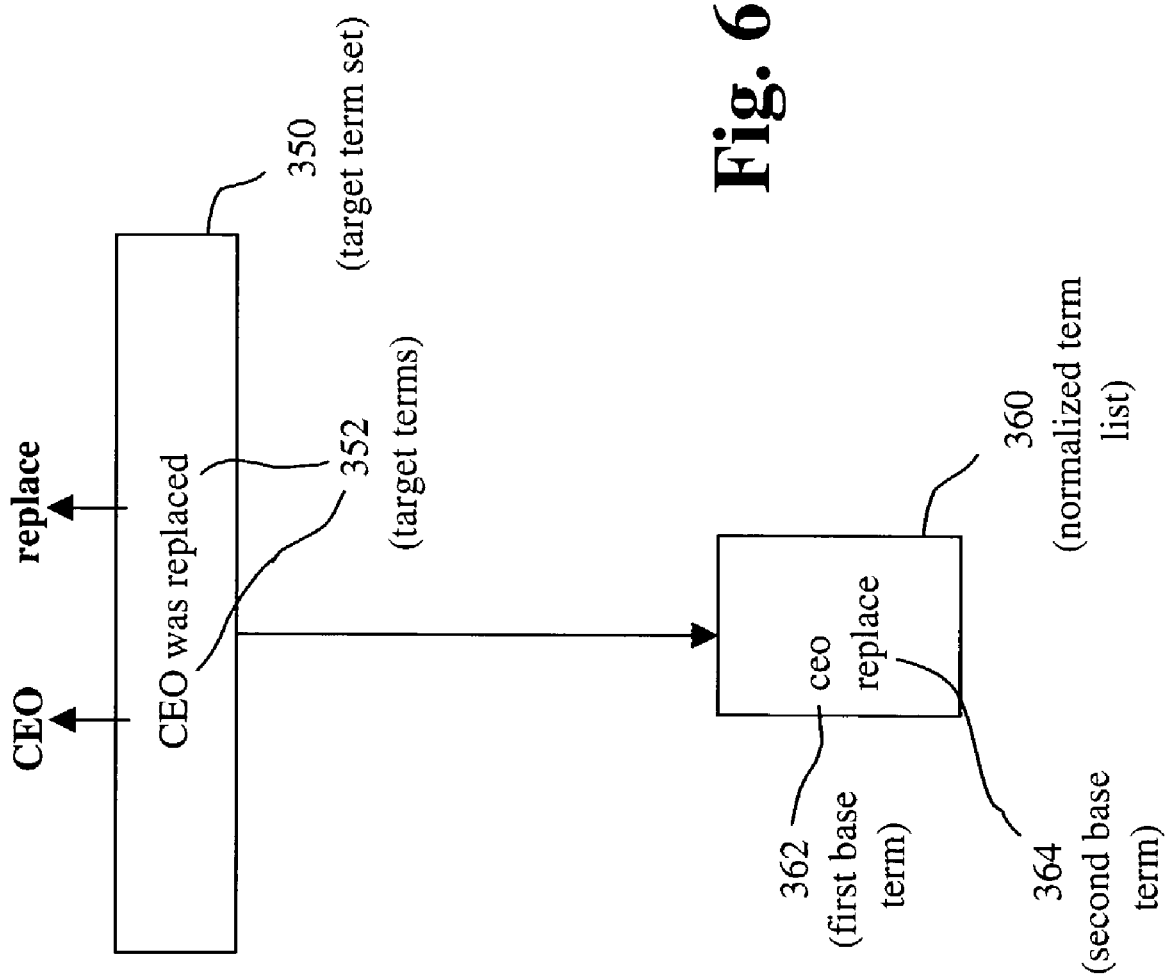
FIG. 6 is a diagram showing aspects of processing a target term set in accordance with one embodiment of the invention.

Returning now to the flowchart of FIG. 1, after step 150, the process passes to step 160. In step 160, the list generation portion 230 performs processing of a target term set, which includes a number of target terms. Aspects of this processing are shown in the diagram of FIG. 6. FIG. 6 shows a target term set 350 that includes the phrase "CEO was replaced", i.e., the target terms 352. The target term set 350 is used to generate a normalized term list 360. Further details of the "process target term set to generate a normalized term list" step 160 of FIG. 1 are shown in the flowchart of FIG. 7.

Figure 7:
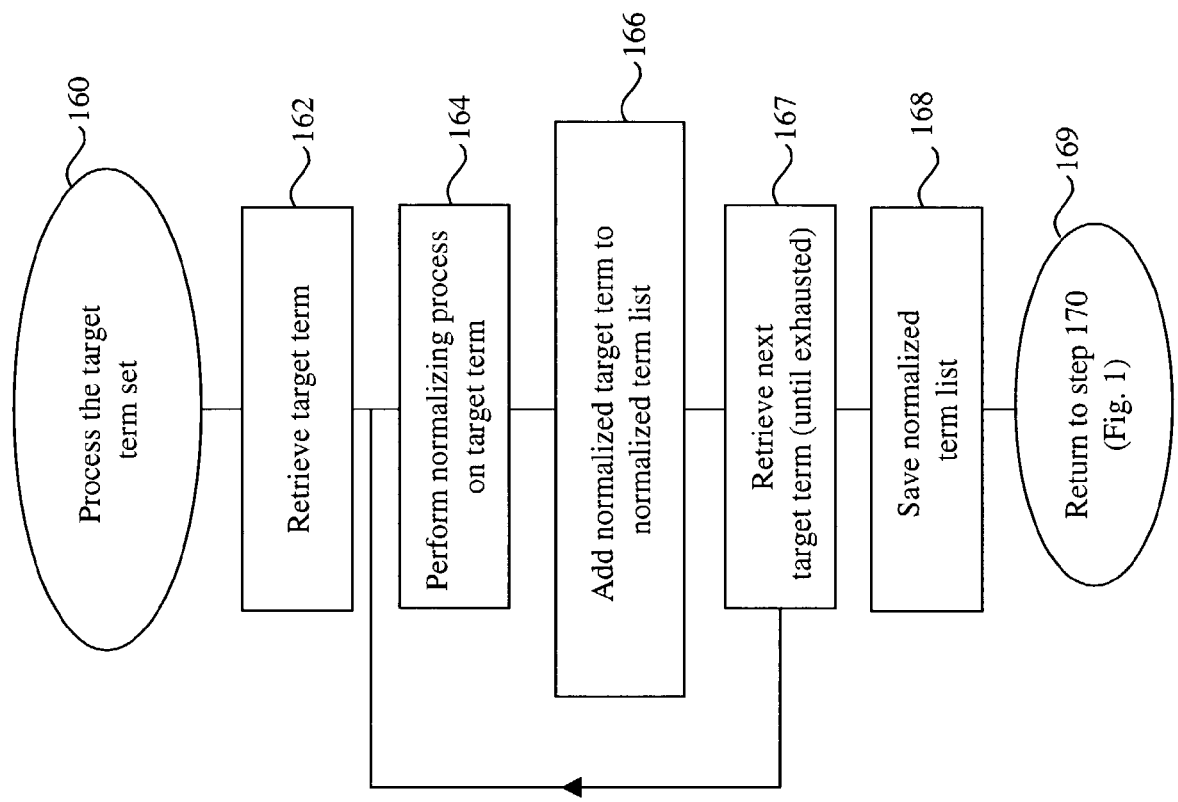
FIG. 7 is a flowchart showing the "process the target term set" step of FIG. 1 in further detail in accordance with one embodiment of the invention.

As shown in FIG. 7, the process starts in step 160 and passes to step 162. In step 162, the list generation portion 230 retrieves a target term from the target term set 350, such as the target term "replaced", as shown in FIG. 6. The list generation portion 230 then outputs this target term to the normalizing portion 240 for processing. The normalizing portion 240 normalizes the target term in the same manner as the words are normalized, i.e., as described above with reference to FIG. 9. The normalizing portion 240, using the normalizing list 340 of FIG. 4, determines (in step 164 of FIG. 7) that the base term of the target term "replaced" is "replace". The normalizing portion 240 then outputs this base term to the list generation portion 230.

In step 166 of FIG. 7, the list generation portion 230 then adds the base term to a normalized term list 360, as shown in FIG. 6. Then, the list generation portion 230 proceeds to step 167 of FIG. 7, in which the list generation portion 230 retrieves the next target term and proceeds to effect the normalizing of that next target term. As indicated in step 167, this continues until all the target terms in the target term set 350 have been processed. As shown in FIG. 6, a first base term 362 is found and a second base term 364 is found. If the list generation portion 230 determines that a base term is already in the normalized term list 360, then no word is added to the normalized term list 360 and the list generation portion 230 proceeds to the next target term in the target term set 350. This process is continued until no further terms are left in the target term set 350. As shown in FIG. 7, after step 167, the process passes to step 168.

In step 168, the normalized term list 360 is saved. For example, the normalized term list 360 might only include the first base term 362 and a second base term 364, as shown in FIG. 6. Then, the process passes to step 169. In step 169, the process returns to step 170 of FIG. 1.

Figure 8:
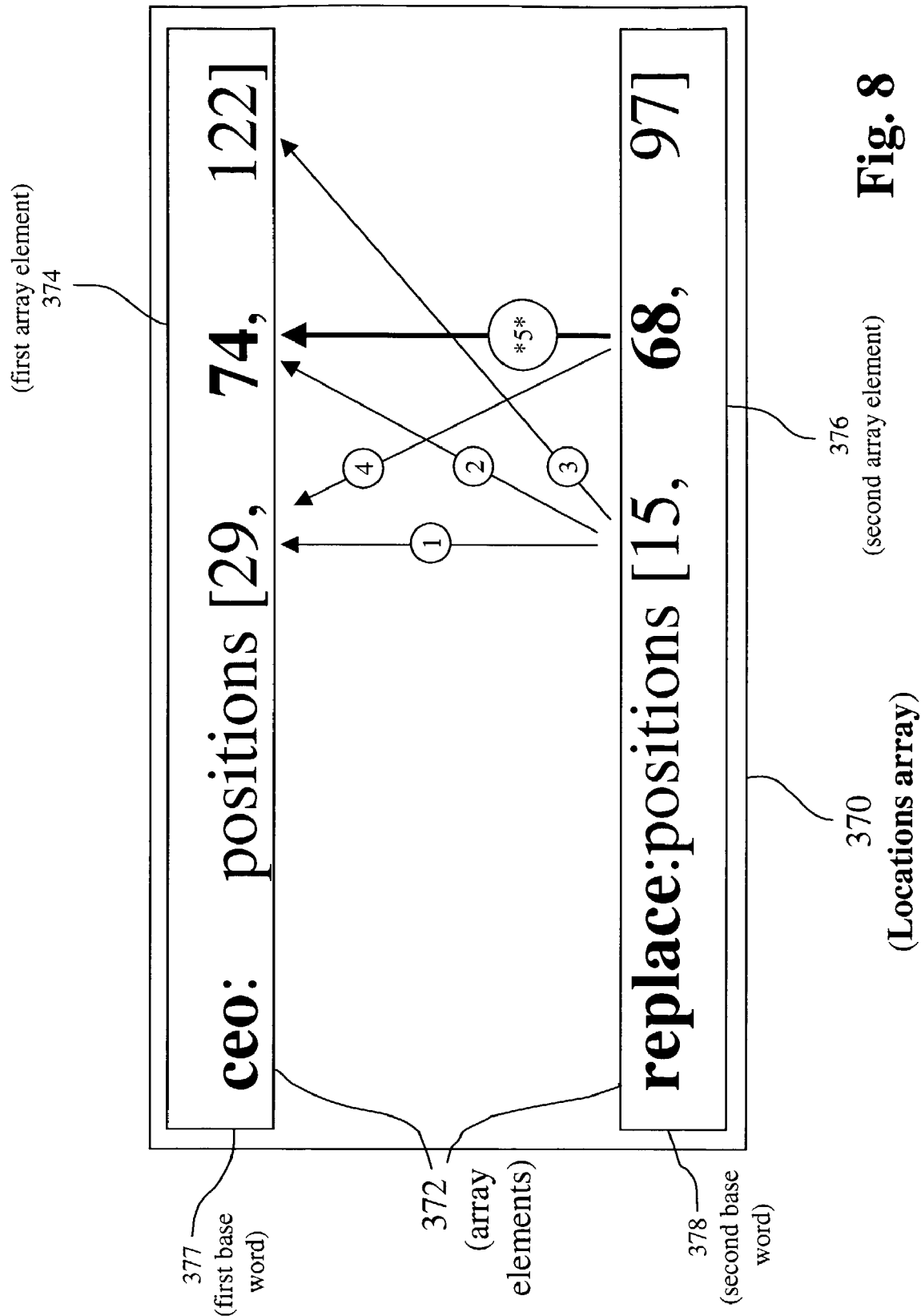
FIG. 8 is a diagram showing aspects of processing a locations array in accordance with one embodiment of the invention.

In step 170 of FIG. 1, the processing passes to the comparing portion 250 of the processing portion 202, in accordance with one embodiment of the invention. In step 170, the base, i.e., normalized, target terms are compared with the base, i.e., normalized, text words to determine any matches. Accordingly, the comparing portion 250 first compares the first base term 362 "ceo" in the normalized term list 360 with the normalized word "century" in the normalized word list 330—resulting in a no-match. Then, the comparing portion 250 compares the first base term 362 "ceo" in the normalized term list 360 with the normalized word "ceo" in the normalized word list 330—resulting in a match. As a result, the base word "ceo" and the various corresponding positions, in the normalized word list 330, are placed into what may be characterized as a locations array, as shown in FIG. 8. For purposes of explanation, the base word "ceo" and the various corresponding positions, in the normalized word list 330, might be characterized as an array element 372.

As should be appreciated, the comparing portion 250 will also determine that the base word/term "replace" is in both the normalized term list 360 and the normalized word list 330, i.e., a match is found. Accordingly, a further array element is added to the locations array of FIG. 8. Once the comparing portion 250 has finished comparing each base term in the normalized term list 360 with each base word in the normalized word list 330, the comparing portion 250 saves the locations array. Then, the process of FIG. 1 passes from step 170 to step 180.

In accordance with one embodiment of the invention, if not all normalized term list elements are found in a normalized word list, then processing stops immediately. The processing stops since no related phrase can exist in the word set, i.e., in accordance with the definition of a related phrase discussed above.

In step 180 of FIG. 1, the process compares the position of a matching first normalized word with the position of a matching second normalized word. In other words, the locations array processing portion 260 (in the processing portion 202) compares the positions in the first array element 374 of FIG. 8 with the second array element 376 of FIG. 8. In the general case, the process compares all combinations of positions belonging to adjacent elements.

In accordance with one embodiment of the invention, step 180 begins by the locations array processing portion 260 checking the absolute value of the difference between the first occurrence, i.e., position, in the first array element 374 and the first occurrence of the second array element 376, as is indicated by the circled (1) in FIG. 8. Thus, this first step using FIG. 8 as an example, includes determining the absolute difference between position 29 and the position 15, or as an expression:

$$|29-15|=14.$$

This distance is then compared with a predetermined threshold distance, which may be stored in the memory 270 for example, to see if the distance is less than the predetermined threshold value, in accordance with one embodiment of the invention. For example, the predetermined threshold distance might be "D=7". As should be apparent, the 14 value is greater than the threshold of 7 and, as a result, the locations array processing portion 260 determines that no phrase was identified based on those two positions (29 and 15).

As a result, the absolute value of the difference between the second occurrence of the first array element 374 and the first occurrence of the second element 376 is checked, for example, as is indicated by the circled (2) in FIG. 8. The search continues in this manner.

To explain further, in accordance with one embodiment of the invention, the process, which may be performed by the locations array processing portion 260, compares all combinations of positions belonging to adjacent elements. For each comparison between a position of the first element and a position of the second element that satisfies the threshold criterion, the participating position of the second element is compared to each of the positions of the third element (if any). This continues until all locations array elements and all their positions are compared with all the positions of their adjacent elements. In essence, the process constructs a set of phrase paths. A phrase path may be characterized as an ordered sequence of position numbers that satisfies two constraints: (1) the sequence contains one position from each element in the locations array, and (2) for each adjacent pair of locations array elements, the corresponding positions contained in the sequence satisfy the threshold criterion.

In further explanation, the locations array processing portion, for example, determines a distance between a text word position of a first normalized word and a text word position of a second normalized word to determine if any relative positions satisfy threshold criteria. The locations array processing portion identifies a first text word position and a second text word position as constituting what may be called "possible" identified text once a relative position of the text word position of the first normalized word and a text word position of the second normalized word satisfies the threshold criteria. Accordingly, the possible identified text results in the output of a phrase if there are only two terms in the particular target term set, i.e., since no further processing is necessary. However, if there are more than two target terms, then further processing is required, i.e., to consider the positions of words that correspond to the third target term, the fourth target term and so on, as is desired.

Thus, any number of target terms and any number of words in a word set may be considered.

In accordance with one embodiment of the invention, the processing of step 180 of FIG. 1 may also include the elimination of phrase paths in which the difference between the minimum and maximum occurrence is greater than or equal to D. This step is to ensure that any phrase that is output has at most D words, which is the function parameter D is intended to serve. For example, if there was a third target term "revenue", a third array element would be included in the locations array of FIG. 8. For example, assume that the word "revenue" was at position 64 in the word set. The process might first include the comparison of the 74 position of "ceo" with the 68 position of "replace", which would satisfy the (D=7) threshold discussed above. Then, the process would compare the 68 position of "replace" with the 64 position of "revenue", which would also satisfy the (D=7) threshold. However, upon the conclusion of step 180, the process would compute the absolute value difference between the minimum and maximum occurrence, i.e., (74−64=10), which is greater than the (D=7) threshold. As a result, the phrase path would be eliminated.

After step 180 of FIG. 1, the process passes to step 190. In step 190, the locations array processing portion 260 outputs a phrase path. That is, the locations array processing portion 260 has determined that the positions 68 and 74 identify a phrase, which is related to the target term set 350 of interest. Thus, the locations array processing portion 260 then uses the word list 320 of FIG. 3 as a look-up table.

That is, the locations array processing portion 260 retrieves each word that corresponds to each of the positions 68 to 74, as shown by the bracket 326 in FIG. 3. This results in the related phrase "replaces the legendary Jack Jones as CEO" being retrieved by the locations array processing portion 260 using the word list 320, as shown in FIG. 3. This related phrase may be output by any suitable means, such as displayed to a user on a monitor, or stored in the memory 270, for example. That is, the process converts each phrase path into words using the index that maps occurrences to document words. If desired, the final output for each event phrase is sorted in decreasing order of the number of words they contain.

After step 190 in FIG. 1, the process passes to step 195. In step 195, the process as set forth in FIG. 1 ends. The process of FIG. 1 might be initiated again by a user to process a different target term set or process a different word set.

It should be appreciated that the above illustrative embodiments of the invention might be varied in a variety of ways. For example, in step 190 above, a user may not wish to use the word list 320 as a look-up table. Rather, the processing might simply go back to the original word set, i.e., so as to look for words in particular positions and generate the identified phrase based on the words found in the word set at those particular positions.

Further, the "lists" and other data structures set forth above are interpreted herein as including a variety of forms. For example, a list might be a data structure including a plurality of pointers, i.e., so as to provide the associations between data that is used in the practice of the various embodiments of the invention.

Further, it should be appreciated that the above described embodiments of the invention do not take into account "parts of speech." Such further layer of processing might be desired in some cases. Illustratively, if used in the sentence "Profits were declining and debt was mounting as the company's stock price had plummeted", the base word for "declining" (functioning as part of the verb phrase) is "decline". If used in the sentence "Declining issues outnumbered advancing ones by a 3-to-1 ratio", then the base word for "declining" (functioning as an adjective) is "declining". Thus, the different parts of speech may be handled as different words to some extent. That is, when taking into account parts of speech in accordance with one embodiment of the invention, the same word might be associated back to two or more base words.

The processing portion 202 as described above may take on any of a variety of forms. For example, the processing portion 202 might be disposed on a computer disk or other computer readable medium that a computer can access. The computer might receive a target term set from a user typing at a keyboard and might receive the word set via a browser accessing the Internet, for example The invention provides for looking for event phrases within a given article, set of articles, or any other word set. All of the events do not need to be explicitly stated before the search begins. By extrapolating events within articles from an existing set of event phrases, the invention allows the capture of related events in the articles. The processing may be done in real time.

In accordance with one aspect of the invention, suitable caching techniques may be used. For example, by caching root forms for words within a document, the speed of the extrapolation process may be enhanced. That is, because words that have been seen before do not need to be processed again to obtain their root or base form.

Also, the introduction of a threshold for capturing new event phrases allows experimentation with capturing events of a larger degree. Larger event phrases may contain more implicitly relevant information about the event such as the actual percentage of job cuts, for example. This information may be of more interest to someone interested in a particular event. Accordingly, the threshold value may be varied as desired. For example, a threshold of "4" might yield desired results.

In accordance with one embodiment of the invention, it should be appreciated that filters might be used so as to consider sentence boundaries, for example. That is, using the example of FIG. 8, the 68 position of "replace" and the 74 position of "ceo" might, for example, not constitute a phrase since the text word at position 70 was the last word in a sentence. Accordingly, sentence boundary filters, as well as other filters might be used, as is desired.

As described above, FIG. 2 shows one embodiment of the system of the invention. Further, FIGS. 1, 5 and 7 show various steps of one embodiment of the method of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A computer-implemented method for identifying text in a word set comprising:

retrieving a target term set including a plurality of target terms;

retrieving the word set including a plurality of text words;

normalizing target terms in the target term set to generate normalized terms;

normalizing text words in the word set to generate normalized words;

comparing the normalized terms with the normalized words to determine:

a first match between a first normalized term and a first normalized word; and a second match between a second normalized term and a second normalized word; and determining a distance between a text word position of the first normalized word and a text word position of the second normalized word to determine if any relative positions satisfy threshold criteria, and identifying a first text word position and a second text word position as constituting possible identified text once a relative position of the text word position of the first normalized word and a text word position of the second normalized word satisfies the threshold criteria.

2. The method of claim 1, wherein normalizing words in the word set includes normalizing significant words and non-significant words.

3. The method of claim 1, wherein normalizing words in the word set further includes applying a stop list against normalized words, so as to eliminate non-significant words.

4. The method of claim 1, wherein the word set is at least a portion of a document.

5. The method of claim 1, wherein retrieving the word set including a plurality of text words includes inputting a text document.

6. The method of claim 5, wherein inputting the text document includes scanning the text document.

7. The method of claim 1, wherein comparing the normalized terms with the normalized words includes generating a normalized ward list containing base words, each base word being associated with a respective text word position in the word set.

8. The method of claim 1, wherein comparing the normalized terms with the normalized words further includes generating a normalized word list of all normalized words, each normalized word in the normalized word list being associated with all the positions of a corresponding text word, in the word set; and generating a normalized term list of all normalized terms.

9. The method of claim 8, further including comparing each normalized term in the normalized term list with each normalized word in the normalized word list.

10. The method of claim 1, wherein identifying a first text word position and a second text word position as constituting possible identified text once a relative position of the text word position of the first normalized word and a text word position of the second normalized word satisfies the threshold criteria, includes outputting the text word that corresponds to the first text word position and outputting the text word that corresponds to the second text word position.

11. The method of claim 10, wherein the method further includes outputting all text words between the text word that corresponds to the first text word position and the text word that corresponds to the second text word position, so as to output an identified phrase.

12. A computer-implemented system for identifying text in a word set comprising:

an input portion that retrieves a target term set including a plurality of target terms, and that retrieves the word set including a plurality of text words;

a normalizing portion that normalizes target terms in the target term set to generate normalized terms, the normalizing portion further normalizing text words in the word set to generate normalized words;

a comparing portion that compares the normalized terms with the normalized words to determine:
a first match between a first normalized term and a first normalized word; and
a second match between a second normalized term and a second normalized word; and
a locations array processing portion that determines a distance between a text word position of the first normalized word and a text word position of the second normalized word to determine if any relative positions satisfy threshold criteria, and the locations array processing portion identifying a first text word position and a second text word position as constituting possible identified text once a relative position of the text word position of the first normalized word and a text word position of the second normalized word satisfies the threshold criteria.

13. The system of claim 12, wherein the comparing portion compares a normalized word list containing base words, each base word being associated with a respective text word position in the word set, with a normalized term list.

14. The system of claim 12, wherein the normalizing portion uses a stop list to determine if any of the normalized terms or any of the normalized words are insignificant.

15. The system of claim 12, wherein the system outputs the text word that corresponds to the first text word position and outputs the text ward that corresponds to the second text word position.

16. The system of claim 15, wherein the system outputs all text words between the text word that corresponds to the first text word position and the text word that corresponds to the second text word position, so as to output an identified phrase.

17. A computer readable medium for identifying text in a word set for use on a computer-implemented system, the computer readable medium comprising:
a first portion that retrieves a target term set including a plurality of target terms, and that retrieves the word set including a plurality of text words;
a second portion that normalizes target terms in the target term set to generate normalized terms, the second portion further normalizing text words in the word set to generate normalized words;
a third portion that compares the normalized terms with the normalized words to determine:
a first match between a first normalized term and a first normalized word; and
a second match between a second normalized term and a second normalized word; and
a fourth portion that determines a distance between a text word position of the first normalized word and a text word position of the second normalized word to determine if any relative positions satisfy threshold criteria, and the fourth portion identifying a first text word position and a second text word position as constituting possible identified text once a relative position of the text word position of the first normalized word and a text word position or the second normalized word satisfies the threshold criteria.

18. A computer-implemented method for identifying text in a word set comprising:
retrieving a target term set including a plurality of target terms;
retrieving the word set including a plurality of text words;
normalizing target terms in the target term set to generate normalized terms;
normalizing text words in the word set to generate normalized words;
comparing the normalized terms with the normalized words to determine:
a first match between a first normalized term and a first normalized word; and
a second match between a second normalized term and a second normalized word; and
determining a distance between a text word position of the first normalized word and a text word position of the second normalized word to determine if any relative positions satisfy threshold criteria, and
identifying a first text word position and a second text word position as constituting possible identified text once a relative position of the text word position of the first normalized word and a text word position of the second normalized word satisfies the threshold criteria;
wherein normalizing words in the word set includes normalizing significant words and non-significant words, the normalizing words in the word set further includes applying a stop list against normalized words, so as to eliminate non-significant words; and
wherein comparing the normalized terms with the normalized words includes generating a normalized word list containing base words, each base word being associated with a respective text word position in the word set, and generating a normalized term list of all normalized terms; and
wherein identifying a first text word position and a second text word position as constituting possible identified text once a relative position of the text word position of the first normalized word and a text word position of the second normalized word satisfies the threshold criteria, includes outputting the text word that corresponds to the first text word position and outputting the text word that corresponds to the second text word position.

19. A computer-implemented system for identifying text in a word set comprising:
an input portion that retrieves a target term set including a plurality of target terms, and that retrieves the word set including a plurality of text words;
a normalizing portion that normalizes target terms in the target term set to generate normalized terms, the normalizing portion further normalizing text words in the word set to generate normalized words;
a comparing portion that compares the normalized terms with the normalized words to determine:
a first match between a first normalized term and a first normalized word; and
a second match between a second normalized term and a second normalized word; and
a locations array processing portion that determines a distance between a text word position of the first normalized word and a text word position of the second normalized word to determine if any relative positions satisfy threshold criteria, and tho locations array processing portion identifying a first text word position and a second text word position as constituting possible identified text once a relative position of the text word position of the first normalized word and a text word position of the second normalized word satisfies the threshold criteria;
wherein the comparing portion compares a normalized word list containing base words, each base word being associated with a respective text word position in the word set, with a normalized term list, the normalizing portion using a stop list to determine if any of the normalized terms or any of the normalized words are insignificant; and wherein the system outputs all text words between and including the text word that corresponds to the first text word position and the text word that corresponds to the second text word position, so as to output an identified phrase.

20. The method of claim 1, wherein the comparing the normalized terms with the normalized words further includes determining:

a third match between a third normalized term and a third normalized word; and determining a distance between the second text word position of the second normalized word and text word positions of the third normalized word to determine if any relative positions satisfy the threshold criteria, and identifying the second text word position and a third text word position as constituting possible identified text once a relative position of the second text word position and a text word position of the third normalized word satisfies the threshold criteria.

21. The method of claim 20, further including outputting a phrase based an the first text word position, the second text word position and the third text word position if there are only three normalized terms.

22. The method of claim 20, wherein the comparing the normalized terms with the normalized words further includes determining:

a fourth match between a fourth normalized term and a fourth normalized word; and determining a distance between the third text word position of the third normalized word and text word positions of the fourth normalized word to determine if any relative positions satisfy the threshold criteria, and identifying the third text word position and a fourth text word position as constituting possible identified text once a relative position of the third text word position and a text word position of the fourth normalized word satisfies the threshold criteria.

* * * * *